United States Patent [19]

Yasui et al.

[11] Patent Number: 4,593,869

[45] Date of Patent: Jun. 10, 1986

[54] DOUBLE-BEARING FISHING REEL

[75] Inventors: Kuniharu Yasui; Kyoichi Kaneko, both of Tokyo, Japan

[73] Assignee: Daiwa Seiko Inc., Higashikurume, Japan

[21] Appl. No.: 660,422

[22] Filed: Oct. 10, 1984

[30] Foreign Application Priority Data

Oct. 28, 1983 [JP] Japan ............................... 58-201981

[51] Int. Cl.⁴ ........................................... A01K 89/015
[52] U.S. Cl. ..................................... 242/220; 242/218
[58] Field of Search ............... 242/211, 212, 213, 216, 242/217, 218, 219, 220, 221, 84.5 R, 84.51 R

[56] References Cited

U.S. PATENT DOCUMENTS 4,142,694  3/1979  Rankin .
4,168,812  9/1979  Karlsson .
4,281,808  8/1981  Noda .................................. 242/218
4,341,366  7/1982  Kawada ............................. 242/220

Primary Examiner—Billy S. Taylor
Attorney, Agent, or Firm—Browdy and Neimark

[57] ABSTRACT

A double-bearing fishing reel includes a pinion which meshes with a drive gear provided on a handle shaft. The pinion is axially and slidably fitted onto a spool shaft which has a spool secured thereon and is supported between reel side plates. The pinion can be engaged and disengaged as desired with respect to a connection portion of the spool shaft by means of a clutch plate which is urged by a dead-point utilizing spring so as to reciprocate. The pinion is separated from the spool shaft by sliding the clutch plate from a clutch-engaging position to a clutch-disengaging position by a pressing motion of a clutch plate operating member projecting from one of the reel side plates, to enable a fishing line to be paid out. The pinion is re-engaged with the spool shaft by sliding the clutch plate from the clutch-disengaging position to the clutch-engaging position by turning the handle shaft, to enable rewinding of the fishing line. A clutch engaging and disengaging apparatus includes a forced-return spring which is provided on the clutch plate and is adapted to urge the clutch plate toward the clutch-engaging position by a force which is larger than that of the dead-point utilizing spring. The clutch engaging and disengaging apparatus also includes a regulator means which controls the force of forced-return spring.

5 Claims, 10 Drawing Figures

DOUBLE-BEARING FISHING REEL

BACKGROUND OF THE INVENTION

1. Field of the Invention:

The present invention relates to an improvement in a clutch engagement apparatus for a double-bearing fishing reel.

2. Description of the Prior Art:

Clutch mechanisms for double-bearing fishing reels are known, such as that shown in the specification of U.S. Pat. No. 4,168,812. A conventional clutch mechanism is arranged so that a pinion which meshes with a drive gear on a handle shaft is slidably fitted onto a spool shaft. The pinion can be engaged and disengaged with respect to the spool shaft as desired by a clutch plate which is urged by a dead-point spring so that it can oscillate between a position at which the pinion is connected to the spool shaft and a position at which it is separated therefrom. The clutch plate is actuated by an operating member which is carried transversely behind the spool so that the pinion can be separated from the spool shaft to enable the paying out of the fishing line. The clutch plate can also move in the opposite direction, making use of a rotational action of the handle shaft so that the pinion is re-engaged with the spool shaft and the fishing line can be re-wound.

A variety of fishing methods are used these days. For instance, when a bass lies behind an obstacle close to the shore, and consequently it is difficult to tempt the bass to strike by casting a lure, it is general practice to adopt a fishing method known as "flipping" wherein a lure is cast so that it is placed before the nose of the bass.

In properly-effected "flipping", however, a difficulty is experienced when using a conventional clutch mechanism such as that described above, which is arranged to enable a change-over of the reel between two states, a line-release state and a line wind-up state. More specifically, in such a clutch mechanism, the spool is held in a freely-rotating state unless the handle is turned, so that it is extremely difficult to make the lure dance as soon as it lands on the water surface to tempt the bass, and pull out the fish when it takes the lure.

However, a reel which is exclusively used for "flipping" is also known, as shown in the specification of U.S. Pat. No. 4,142,694. The reel is arranged so that, when a clutch-operating member is pressed, the pinion is separated from the spool shaft, and when that pressing operation is cancelled, the pinion is connected to the spool shaft. This type of reel is, however, not suitable for ordinary fishing.

SUMMARY OF THE INVENTION

Accordingly, it is a first object of the present invention to provide a double-bearing fishing reel in which the mechanism for engaging and disengaging the spool shaft and the pinion is arranged so that the reel can be employed for both ordinary fishing and "flipping", thereby enabling an improvement in the utility value of the double-bearing reel.

To this end, according to one aspect of the present invention, a double-bearing fishing reel is arranged so that it can act as a conventional double-bearing reel which enables ordinary fishing, in which the pinion is separated from the spool shaft so that the spool shaft is released, by actuating an operating member of a clutch plate, and the pinion is connected to the spool shaft by turning the handle so as to restore the spool shaft to a line wind-up state. The reel is further arranged so that it can be changed over between the line-release state and the line wind-up state by a simple changeover operation. More specifically, the spool shaft is released only when the operating member of the clutch plate is pressed down, and the spool shaft is immediately returned to the line wind-up state when that pressing operation is cancelled, enabling the reel to be used for "flipping".

It is a second object of the present invention to provide a fishing reel in which an ordinary fishing mode and a "flipping" mode can be easily and speedily changed over by a single, simple operation of a regulator member which is provided on a reel side plate.

It is a third object of the present invention to provide a fishing reel in which the force of a forced-return spring which urges the clutch plate toward an engaged position is smoothly and reliably controlled by a simple mechanism, by employing as the forced-return spring a coiled spring utilizing a dead point.

These and other objects, features and advantages of the present invention will become clear from the following description of preferred embodiments thereof, taken in conjunction with the accompanying drawings.

DESCRIPTION OF THE PREFERRED EMBODIMENTS

Figure 1:
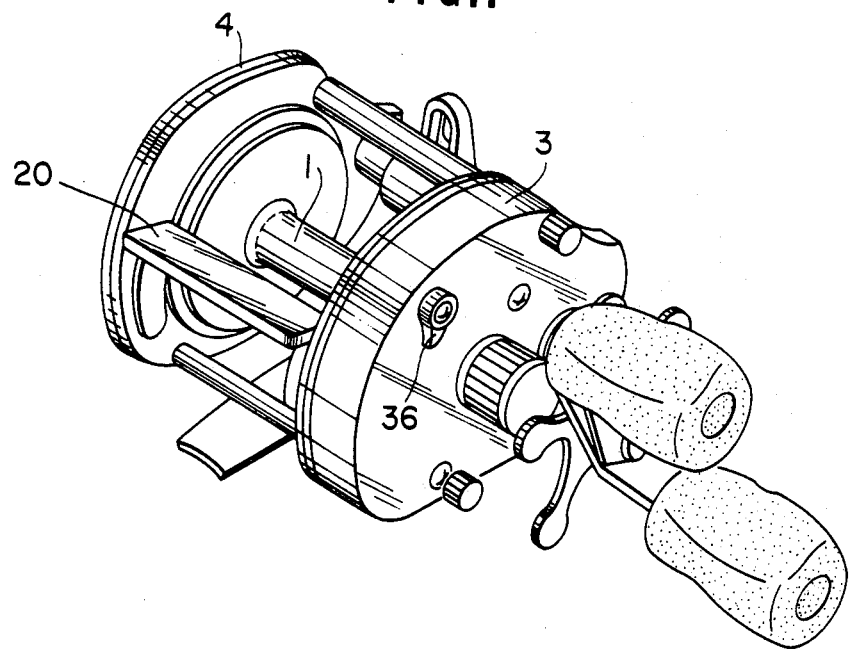
FIG. 1 is a perspective view of a double-bearing fishing reel in accordance with the present invention.

An embodiment of the present invention will be described hereinunder in detail with reference to the accompanying drawings.

A spool shaft 2 with a spool 1 secured thereon is rotatably supported between reel side plates 3, 4. A pinion 6 is disengageably fitted onto a connection portion 5 provided on the side of the spool shaft 2 which is closer to the reel side plate 3. The pinion 6 meshes with a drive gear 8 which is provided on a handle shaft 7, and an engagement plate 9 connected to the pinion 6 is fitted onto a pair of studs 11 standing upright on a frame plate 10 of the reel side plate 3. The engagement plate 9 is urged by springs 12 each screwed onto the studs 11, such as to connect the pinion 6 to the connection portion 5.

A clutch plate 15 is provided on the surface of the frame plate 10 inward of the pair of studs 11. The clutch plate 15 is provided with fork ends 13 which extend to either side of the spool shaft 2. The fork ends 13 are provided with a pair of actuator cams 14 which project symmetrically therefrom. The inner end of the clutch plate 15 is provided with a slot 16 in which a guide pin 17 projecting from the frame plate 10 fits so as to enable the clutch plate 15 to slide in a substantially radial direction relative to the spool 1. A W-shaped spring 18 is retained by the guide pin 17 and shoulders on either side of the inner portion of the clutch plate 15, so that an intermediate coil portion of the spring 18 is provided between the guide pin 17 and each shoulder. This arrangement makes it possible to urge the clutch plate 15 so that it can reciprocate between an inner position and an outer position, making use of the dead point of the W-shaped spring 18. When the clutch plate 15 is urged toward the inner position, the actuator cams 14 make the engagement plate 9 slide outward, so that the pinion 6 is disengaged from the connection portion 5 of the spool shaft 2, and thus the spool 1 is held free. On the other hand, when the clutch plate 15 is urged toward the outer position, the actuator cams 14 do not engage with the engagement plate 9, so that the pinion 6 is engaged with the connection portion 5 by the action of the springs 12, connecting together the handle shaft 7 and the spool shaft 2 and enabling rewinding of the fishing line.

Figure 2:
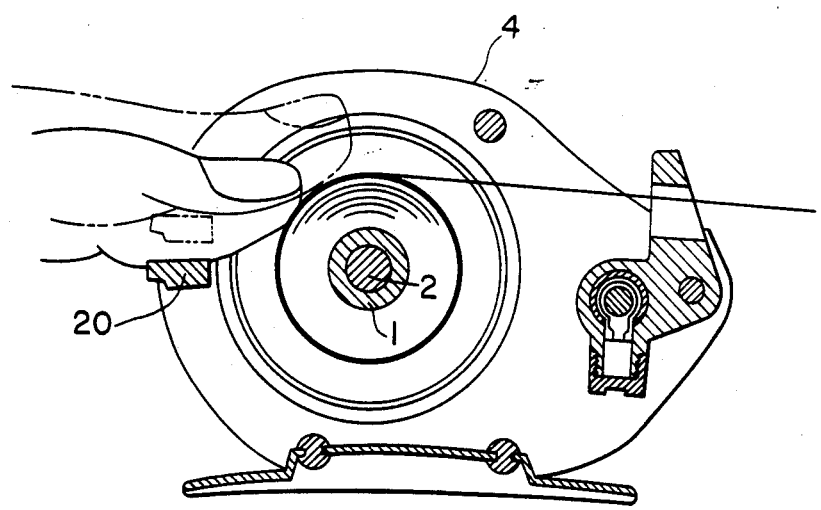
FIG. 2 is a vertically-sectioned front elevation of the double-bearing reel.

An operating member 20 is vertically movably supported between the reel side plates 3, 4 behind the spool 1 on a slide guide 19. The operating member 20 and the lower side of the inner portion of the clutch plate 15 are linked together by a lever 21. The arrangement is such that the clutch plate 15 can be moved to the inner position by pressing the operating member 20 downward with the ball of the thumb, as shown in FIG. 2.

One fork end 13 of the forked portion of the clutch plate 15 is provided with an elongated portion 22 in which is formed a second slot 23 which meshes with a second guide pin 24 projecting from the frame plate 10. The pin 24, in cooperation with the guide pin 17, allows the clutch plate 15 to slide smoothly. An actuator piece 27 which has at its free end a retainer portion 25, and which is pulled inward by a spring 26, is fitted onto the second guide pin 24 by a slot 28 formed in the actuator piece 27 so as to be superposed on the elongated portion 22 of the clutch plate 15. A regulator projection 29 and an engagement projection 30 are formed at the lower edge of the free end of the elongated portion 22 and the rear portion of the second slot 23, respectively. When the clutch plate 15 is slid to the inner position, the actuator piece 27 is pulled by the spring 26 so as to pivot counterclockwise, and the retainer portion 25 approaches the handle shaft 7. On the other hand, when the clutch plate 15 is at the outer position, the regulator projection 29 abuts against the lower side of the fitting portion between the actuator piece 27 and the guide pin 24, so that the actuator piece 27 is prevented from being pulled inward by the spring 26.

A reverse-prevention ratchet wheel 32, with which a reverse-prevention pawl 31 engages, is secured to the free end portion of the handle shaft 7. A plurality of kick pins 33 are provided on the front surface of the reverse-prevention ratchet wheel 32 so as to engage with the retainer portion 25 of the actuator piece 27 when it is pulled inward.

An actuator plate 34 is pivotally supported by one of the pair of studs 11. A forced-return coiled spring 35 which urges the clutch plate 15 toward the outer position has ends which are retained by a free end portion of the actuator plate 34 and the retainer portion for the W-shaped spring 18 on the upper side of the clutch plate 15, respectively. The free end portion of the actuator plate 34 is controlled by a regulator member 37, such as a cam, which is provided with a knob 36 and is pivotally supported by the reel side plate 3. Rotating the knob 36 makes it possible to adjust the magnitude of the force of the forced-return coiled spring 35. The arrangement is such that, when the pressure exerted by the regulator member 37 on the free end portion of the actuator plate 34 is a maximum, the force of the forced-return coiled spring 35 is larger than the inward force of the W-shaped spring 18.

Figure 3:
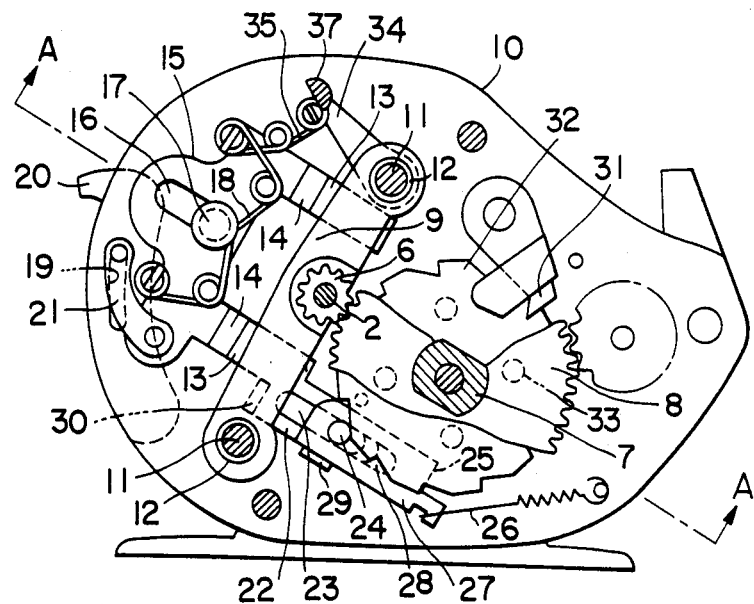
FIG. 3 is a partially-cutaway front elevation of the double-bearing reel in a line wind-up state.
Figure 4:
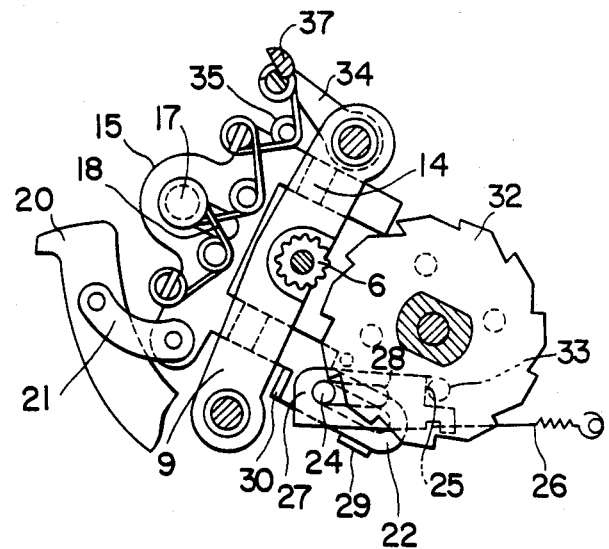
FIG. 4 is a front elevation of the double-bearing reel in a line-release state.
Figure 5:
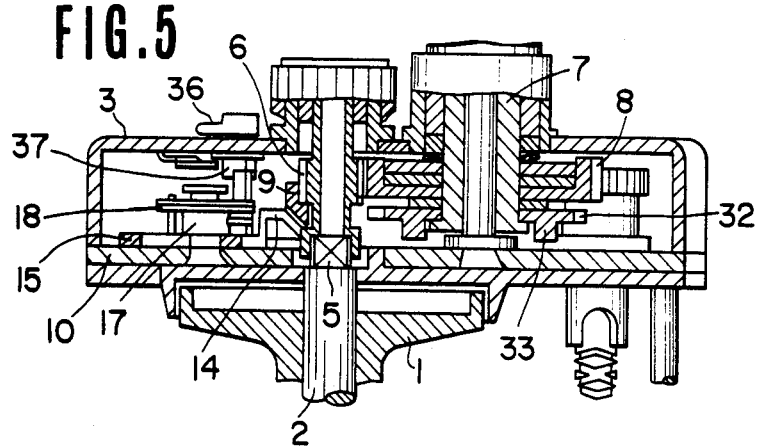
FIG. 5 is a section taken along the line A—A of FIG. 3.
Figure 6:
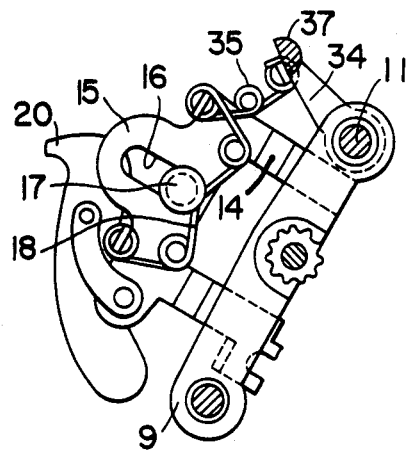
FIG. 6 illustrates the operation of the double-bearing reel in a line-wind-up state when a "flipping" knob is inoperative.
Figure 7:
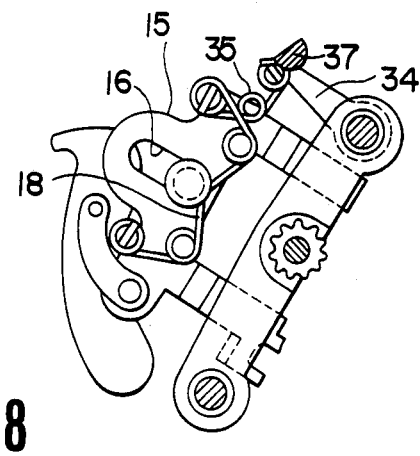
FIG. 7 illustrates the operation of the double-bearing reel in the line wind-up state when the "flipping" knob is operative.

This embodiment of the present invention is constructed as described above. When casting, the operating member 20 is pressed downward with the ball of the thumb of the hand holding the casting handle, so that the clutch plate 15 is slid inward by the lever 21. When the clutch plate 15 has passed the dead point of the W-shaped spring 18, the clutch plate 15 is urged by the W-shaped spring 18 so as shift from the position shown in FIG. 3 to the position shown in FIG. 4. In consequence, the actuator cams 14 press the engagement plate 9 so as to allow the pinion 6 to separate from the connection portion 5 of the spool shaft 2, releasing the spool 1 to its a free state. At the same time, the actuator piece 27 is pulled by the spring 26 so that the retainer portion 25 of the actuator piece 27 is held in the rotational path of the kick pins 33. Accordingly, in this state, it is possible to let out the fishing line while thumbing the flange portion of the spool 1 with the tip of the thumb pressing against the operating member 20, in the same posture as that before the pressing operation.

In this state, when the handle shaft 7 is rotated in the direction rewinding the fishing line, the kick pins 33 on the reverse-prevention ratchet wheel 32 rotate, and one of them engages with the retainer portion 25 of the actuator piece 27 and presses it so that the actuator piece 27 is slid backward along the slot 28 and its rear end abuts against the engagement projection 30. In this position, the actuator piece 27 pushes the clutch plate 15 until the clutch plate 15 passes the dead point of the W-shaped spring 18, so that the clutch plate 15 is restored by the W-shaped spring 18 to the line wind-up state shown in FIG. 3, and the pinion 6 is re-engaged with the connection portion 5 of the spool shaft 2, enabling rewinding of the fishing line on the spool 1.

Figure 8:
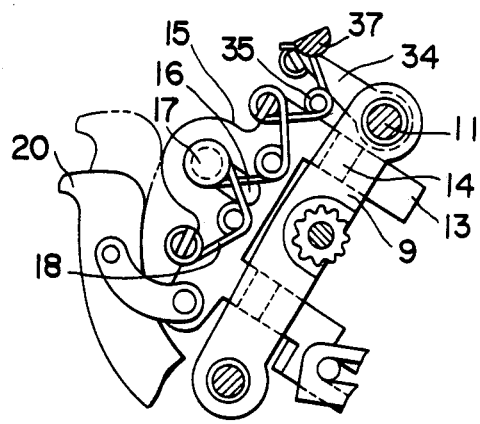
FIG. 8 illustrates the operation of the double-bearing reel in a line-release state when the "flipping" knob is operative.
Figure 9:
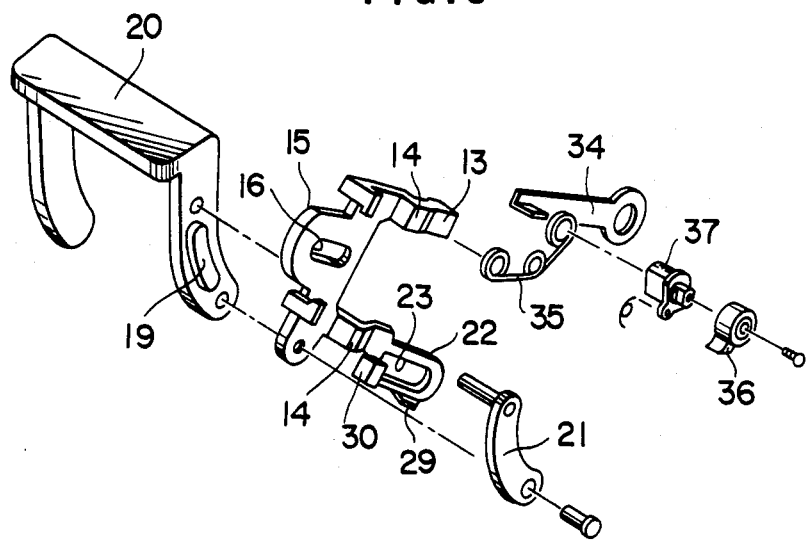
FIG. 9 is an exploded perspective view of essential parts of the double-bearing reel in accordance with the present invention.

When "flipping", the knob 36 is rotated so that the rotation of the actuator plate 34 is regulated by the cam 37, as shown in FIG. 8. As a result, the outward force of the forced-return coiled spring 35 becomes larger than the inward force of the W-shaped spring 18. Therefore, if the operating member 20 is pressed downward so that the clutch plate 15 is slid inward to separate the spool shaft 2 and the pinion 6 from each other, releasing the spool 1, when the force on the operating member 20 is cancelled, the clutch plate 15 is immediately returned to the outer position so as to restore the line wind-up state.

In this way, it is possible to cast the lure to a desired point by letting out the fishing line little-by-little, while repeating the above operation, and by stopping the line.

Thus, it is possible to effect "flipping" wherein, the lure is made to dance on the water surface as soon as it lands, in such a way that it tempts the bass, and when the fish bites, it can be pulled up at a single stroke.

Figure 10:
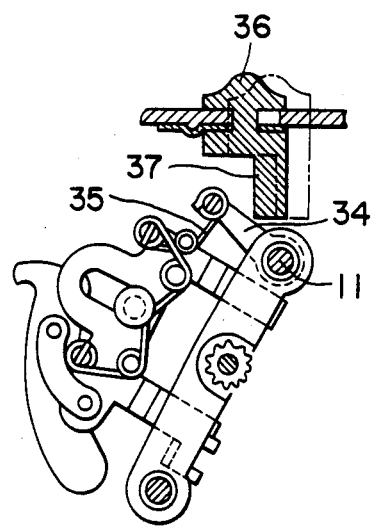
FIG. 10 illustrates the operation of a regulator member in accordance with another embodiment of the present invention.

FIG. 10 shows another embodiment of the present invention, in which the knob 36 is provided on the reel side plate 3 so that it can be slid backward and forward, and the actuator plate 34 is pivoted by being pressed by the regulator member 37 which is provided at a lower portion of the knob 36, thereby regulating the force of the forced-return coiled spring 35.

As described above, the double-bearing fishing reel in accordance with the present invention is arranged so that the spool shaft is released by actuating an operating member, and is restored to a line wind-up state by turning the handle in the manner similar to that used in a conventional double-bearing reel. Therefore it is obviously possible to effect an ordinary fishing. In particular, the double-bearing reel of the present invention is arranged so that a clutch plate, which is urged by a dead-point utilizing spring such as to move between the inner and outer positions, is provided with a forced-return spring which urges the clutch plate outward with a force which is larger than the force of the dead-point spring, and the force of the forced-return spring can be changed by a the regulator member provided on one of the reel side plates, so that the force thereof is larger than the inward force of the dead-point spring when "flipping" is effected. Therefore, while the operating member is pressed, the fishing line can be let out, but when this pressing operation is cancelled, the pinion is re-engaged with the spool shaft, immediately enabling winding up of the line. Accordingly, it is possible to smoothly and easily effect "flipping", making it possible to improve the utility value of this type of fishing reel. In addition, the present invention has the advantage that it is extremely easy to regulate the force of the forced-return spring.

What is claimed is:

1. In a double bearing fishing reel including side plates; a spool shaft mounted between the side plates and including a connection portion; a spool supported for rotation with the spool shaft; handle shaft means coupled with the spool; a drive gear on the handle shaft means; a pinion axially slidably mounted on the spool shaft for meashing engagement with the drive gear; a dead-point utilizing spring; clutch means including a clutch plate and control means, the clutch plate being urged by the dead-point spring for reciprocable sliding movement between a first position in which the pinion engages the connection portion and a second position in which the pinion is caused to be disengaged from the connection portion; and a clutch plate operating member, projecting from one of the reel side plates, for actuating movement of the clutch plate to the second position, the pinion being separated from the connection portion following pressing motion of the clutch plate operating member to effect sliding movement of the clutch plate from the first position to the second position whereby fishing line on the spool may be payed out, and the clutch control means causing engagement of the pinion with the connection portion upon turning of the handle shaft means to effect sliding movement of the clutch plate from the second position back to the first position whereby the fishing line may be rewound on the spool, apparatus for regulating movement of said clutch plate, comprising:

forced-return spring means, provided on said clutch plate, for urging said clutch plate toward said first position with a force which is larger than the force of said dead-point utilizing spring, and regulator means for controlling the force of said forced-return spring means.

2. In a double bearing fishing reel including side plates; a spool shaft mounted between the side plates and including a connection portion; a spool supported for rotation with the spool shaft; handle shaft means coupled with the spool; a drive gear on the handle shaft means; a pinion axially slidably mounted on the spool shaft for meshing engagement with the drive gear; a dead-point utilizing spring; clutch means, including a clutch plate and control means, said clutch plate being urged by the dead-point spring for reciprocable sliding movement between a first position in which the pinion engages the connection portion and a second position in which the pinion is caused to be disengaged from the connection portion; and a clutch plate operating member, carried transversely between the reel side plates behind the spool, for actuating movement of the cluth plate to the second position, the pinion being separated from the connection portion following pressing motion of the clutch plate operating member to effect sliding movement of the clutch plate from the first position to the second position whereby fishing line on the spool may be payed out, and the clutch control means causing engagement of the pinion with the connection portion upon turning of the handle shaft means to effect sliding movement of the clutch plate from the second position back to the first position whereby the fishing line may be rewound on the spool apparatus for regulating movement of said clutch plate, comprising:

an actuator plate pivotally attached to one of said reel side plates, forced-return spring means, connected between said clutch plate and a free end portion of said actuator plate, for urging said clutch plate toward said first position with a force larger than the force of said dead-point utilizing spring, and a regulator member, supported on said reel side plate, for regulating the pivoting of said actuator plate, whereby the force of said forced-return spring means may be controlled.

3. The regulating apparatus according to claim 2, wherein said forced-return spring comprises a coiled spring having ends retained by the free end of said actuator piece and said clutch plate, respectively.

4. The regulating apparatus according to claim 2, wherein said regulator member comprises a cam and includes means for pivotally attaching said cam to said reel side plate, said cam engaging with said actuator plate so as to regulate the pivoting of said actuator plate, thereby controlling the force of said forced-return spring.

5. The regulating apparatus according to claim 2, wherein said regulator member is slidably mounted on said reel side plate in backward and forward directions, and the pivoting of said actuator plate is regulated by the sliding action of said regulator member, thereby controlling the force of said forced-return spring.

* * * * *